April 20, 1926.
M. DE GARMO
KITCHEN CABINET
Filed Feb. 2, 1924
1,581,840
2 Sheets-Sheet 1
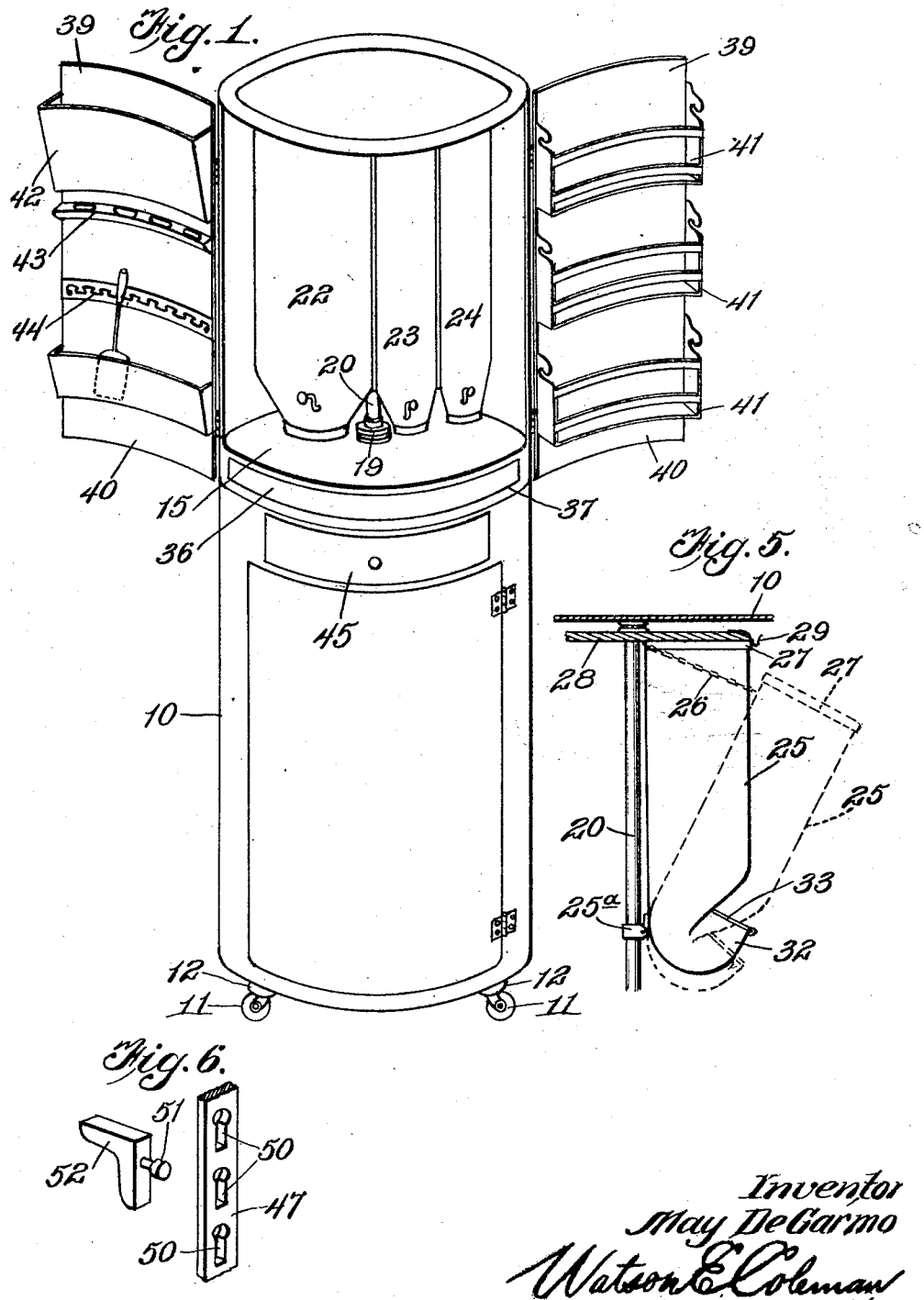
Inventor
May DeGarmo
Watson E. Coleman
Atty

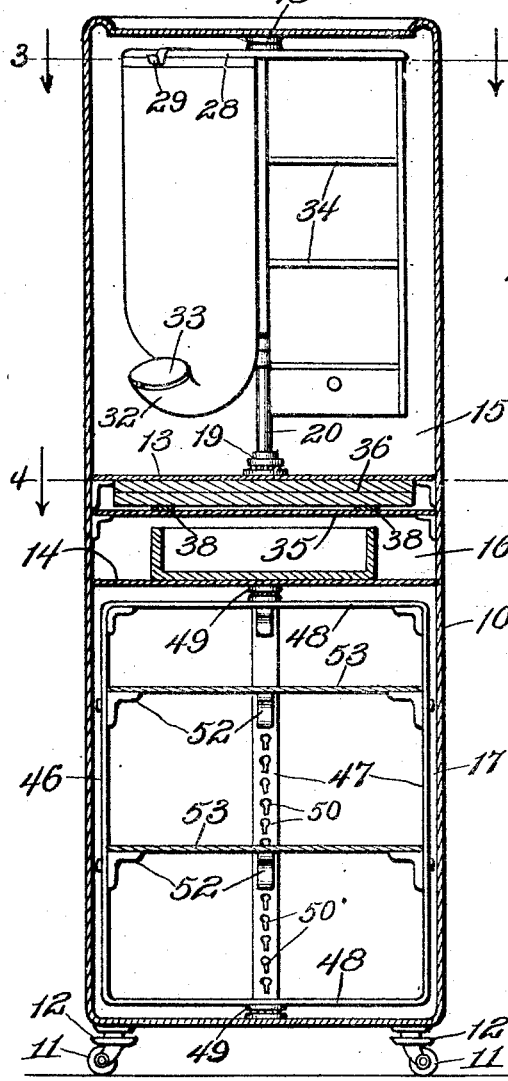
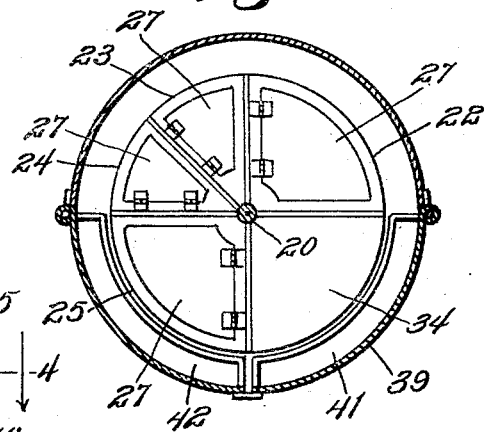
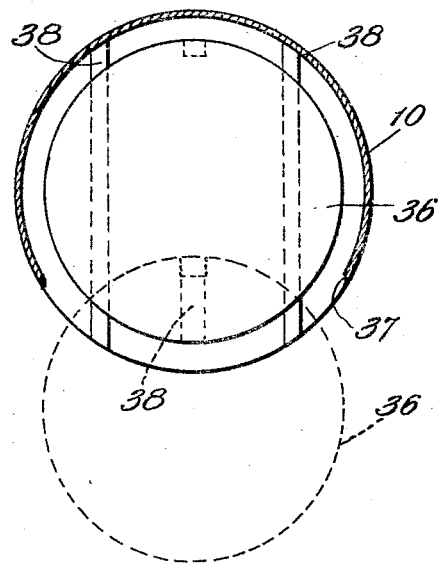
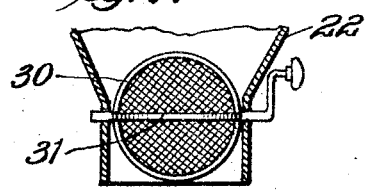

Patented Apr. 20, 1926.

1,581,840

UNITED STATES PATENT OFFICE.

MAY DE GARMO, OF SOUTH GLENS FALLS, NEW YORK.

KITCHEN CABINET.

Application filed February 2, 1924. Serial No. 690,253.

*To all whom it may concern:*

Be it known that I, MAY DE GARMO, a citizen of the United States, residing at South Glens Falls, in the county of Saratoga and State of New York, have invented certain new and useful Improvements in Kitchen Cabinets, of which the following is a specification, reference being had to the accompanying drawings.

This invention relates to improvements in kitchen cabinets.

An important object of the invention is to provide a device of this character which affords a maximum of storage space with respect to the space occupied by the cabinet and which is so constructed that it is insect and rodent proof.

A further object of the invention is to provide in a device of this character a novel and improved adjustable shelf structure.

A further object of the invention is to provide a novel and improved rotatable support having a plurality of tiltable receptacles mounted thereon, the tilting of the receptacles positioning them so that their contents may be readily replenished.

A still further object of the invention is to provide a device of this character which is simple and durable in its construction, efficient in service and a general improvement in the art.

These and other objects I attain by the construction shown in the accompanying drawings, wherein for the purpose of illustration is shown a preferred embodiment of my invention and wherein:—

Figure 1 is a perspective view of a cabinet constructed in accordance with my invention;

Figure 2 is a vertical sectional view therethrough;

Figure 3 is a section on the line 3—3 of Figure 2;

Figure 4 is a section on the line 4—4 of Figure 2, the operative position of the bread board being indicated in dotted lines;

Figure 5 is an enlarged detail view showing the mounting of the containers of the upper cabinet;

Figure 6 is an enlarged detail perspective view showing the manner of attaching the shelf-holding brackets;

Figure 7 is a detail sectional view showing the retaining agitator employed in the bin 22.

Referring now more particularly to the drawings, the numeral 10 indicates a cylindrical casing having closed top and bottom and supported by casters 11, which casters are preferably provided with insect checks 12. The casing is provided approximately centrally thereof with upper and lower partitions 13 and 14 dividing the casing of the cabinet to provide an upper compartment 15, an intermediate compartment 16 and a lower compartment 17.

Disposed upon the under face of the upper wall of the upper compartment is a thrust bearing 18 which aligns with a thrust 19 arranged upon the upper surface of the partition 13, these bearings coacting to rotatably support a vertically disposed pivot member 20 extending axially of the compartment 15. The numerals 21, 22, 23, 24 and 25 designate compartments for storing and dispensing comminuted substances such as flours and sugar. Each of these compartments is segmental in cross section and tapers to a point adjacent its lower end to the lower end. Each compartment is pivoted at its lower end, as at 25$^a$, to the pivot member 20 and adjacent its upper end is connected to this pivot member by a flexible element 26 permitting tilting of the compartment until the upper surface thereof is clear of the upper wall of the casing 10 so that its upper surface is readily accessible. These upper surfaces are formed by pivoted lids 27 which, when the containers are tilted to the limits defined by the flexible elements 26, may be swung open to permit cleansing of the container for the replenishing of the contents thereof. The rotatable support 20 has secured thereto an additional support or supports 28 bearing spring catches 29 which engage the containers 22 to 25 inclusive to normally hold them in vertical position. The container 22 is intended for the reception of pastry flour and the container 25 for the reception of sugar, the remaining containers 23 and 24 being used to contain any desired substance such as graham flour and corn meal.

The flour container 22 is provided in its lower end with an agitator 30 having a plurality of blades 31, one of which is formed from a solid sheet of metal so that when this blade is disposed transversely of the opening the passage of flour is prevented. It is well-known that vibration to which cabinets of this character are subjected, due to rotation of the various receptacles embodied therein, causes the light substances, particularly flour, to sift downwardly so that they rest upon the closure cap 31 at the lower end of the container in a considerable quantity with the result that they are often spilled when the cap is removed. A structure of this type prevents this occurrence, it being merely necessary to position the handle of the agitator in a given direction to completely seal the lower end of the container. The containers 23, 24 and 25 are preferably constructed as more clearly shown in Figure 5. In this figure it is seen that the rear wall of the container is bent outwardly and upwardly to form a tray and the front wall is continued into this tray so that it combines with the rear wall to provide a reverted end portion 32 upon the container having a pivoted lid 33 through which the contents are rendered accessible. The compartments 22 to 25 inclusive may occupy approximately three-quarters of the space afforded in the cabinet compartment 15, the remainder of the space being occupied by shelving 34 carried by the pivot member 20. Within the compartment 16 is arranged an auxiliary partition 35 slightly spaced below the partition 13 and forming a support for a bread board 36 operating through a slot 37 formed in the outer wall of the casing 10. The partition 35 has extending upwardly therefrom lugs 38 engaging in the under surface of the bread board 36 to limit its outward movement. The compartment 15 embodies a pair of doors 39 which form about one-half of the circumference of the outer wall of the compartment. The lower ends of these doors are provided with flanges 40 extending over the slot 37 and retaining the bread board in position within the slot as long as either of these doors is closed. One of the doors 39 is preferably provided upon its inner surface with racks for the reception of extracts, spices and condiments, as indicated at 41, while the other of the doors is provided with suitable supports for cook books, as at 42, coins and milk tickets, as at 43, and kitchen utensils, as at 44. Below the auxiliary partition 35 the compartment 16 is provided with a drawer 45 which may be withdrawn at any time regardless of the position of the doors 39 of the upper compartment, this drawer being intended for the reception of silverware and the like.

Arranged within the lower compartment 17 is a skeletonic frame 46 consisting of circumferentially spaced vertical members 47 the ends of which are horizontally bent, as at 48, and have their terminal portions secured to one member of the thrust bearings 49, the other members of which are carried by the lower surface of the partition 14 and the upper surface of the bottom of the casing 10 respectively. The vertical members of the frame are each provided with vertically spaced key-hole slots 50 interchangeably receiving the securing lugs 51 of shelf-holding brackets 52. A plurality of these shelfholding brackets are mounted upon each of the vertical members and serve as supports for shelves 53, the height of which may be adjusted by adjusting the brackets. In the construction of the cabinet the corners of the casing 10 and of each of the compartments thereof are preferably rounded, so that as few corners are presented as possible for the collection of dust and dirt.

From the foregoing it is believed to be obvious that a cabinet constructed in accordance with my invention provides a structure in which the storage space is all brought into use and which at the same time occupies but little room for the amount of storage space provided. Since the details of structure of the cabinet are capable of a considerable range of change and modification without in any manner departing from the spirit of my invention, I do not limit myself to such specific structure as hereinbefore set forth except as hereinafter claimed.

I claim:—

1. In a cabinet, a circular casing having opposed upper and lower walls each provided with a bearing, a vertical support having its ends rotatably engaged in said bearings and a plurality of containers pivoted at their lower ends to said support, flexible elements connecting the upper ends of the containers with the support, and means carried by said support for locking the upper ends of the containers in position against the support.

2. In a cabinet, a circular casing having opposed upper and lower walls each provided with a bearing, a vertical support having its ends rotatably engaged in said bearings and a plurality of containers pivoted at their lower ends to said support, flexible elements connecting the upper ends of the containers with the support, and means carried by said support for locking the upper ends of the containers in position against the support, each of said containers being segmental in cross section.

3. In a cabinet, a circular casing having opposed upper and lower walls each provided with a bearing, a vertical support having its ends rotatably engaged in said bearings and a plurality of containers pivoted at their lower ends to said support, flexible elements connecting the upper ends of the containers with the support, and means carried by said support for locking the upper ends of the containers in position against the support, each of said containers being segmental in cross section and embodying a hinged cover swingable to open position when the container is at the limit of its movement as defined by its associated flexible element.

In testimony whereof I hereunto affix my signature.

MAY DE GARMO.